United States Patent [19]

Knoll et al.

[11] Patent Number: 4,955,698

[45] Date of Patent: Sep. 11, 1990

[54] OPTO-ELECTRONIC INDICATING MATRIX, AND INDICATING DEVICE PROVIDED THEREWITH

[75] Inventors: Peter Knoll, Ettlingen; Winfried König, Pfinztal-Berghausen; Rüdiger Mock-Hecker, Karlsruhe; Clemens Günther, Sexau, all of Fed. Rep. of Germany

[73] Assignee: Robert Bosch GmbH, Stuttgart, Fed. Rep. of Germany

[21] Appl. No.: 322,781

[22] Filed: Mar. 3, 1989

[30] Foreign Application Priority Data

Mar. 3, 1988 [DE] Fed. Rep. of Germany ....... 3806843

[51] Int. Cl.$^5$ ................................................ G02F 1/13
[52] U.S. Cl. ...................................... 350/336; 350/333; 350/334
[58] Field of Search ................. 350/334, 336, 392, 333

[56] References Cited

U.S. PATENT DOCUMENTS 4,335,937  6/1982  Takamatsu et al. ................ 350/336
4,593,978  6/1986  Mourey et al. ................ 350/336 X

FOREIGN PATENT DOCUMENTS 0196215  12/1982  Japan ................................... 350/336

Primary Examiner—Stanley D. Miller
Assistant Examiner—Huy K. Mai
Attorney, Agent, or Firm—Michael J. Striker

[57] ABSTRACT

An opto-electronic indicating matrix comprises a plurality of row and column segments controllable in a multiplex operation, and means for electrically connecting the row and column segments and including a plurality of conductors arranged in regions between the row segments and inclined to a longitudinal axis of the row axis so as to extend parallel to one another in one plane. A preferable application of the matrix is in an indicator for travel guiding information in a power vehicle.

9 Claims, 2 Drawing Sheets

OPTO-ELECTRONIC INDICATING MATRIX, AND INDICATING DEVICE PROVIDED THEREWITH

BACKGROUND OF THE INVENTION

The present invention relates to an opto-electronic indicating matrix with row and column segments which are controlled in multiplex operation. The present invention also relates to an indicating device which uses the inventive opto-electronic indicating matrix.

The opto-electronic structural elements are active or passive structural elements which send light signals. The active structural elements are semiconductor emitters such as light-emitting diodes (LED), semiconductor indicators and gas-discharge indicators. Passive structural elements are especially liquid crystal indicators, in which the surrounding air is modulated and so that the required contrast change is achieved.

Matrices are composed of individual segments which are arranged in n rows and m columns. For example in the case of seven segment indicator, seven LED are mounted on a metal support and cast with synthetic plastic material Numerical or alphanumerical indicators can be designed both for static and also so-called time multiplex operations with frequencies which lie for example over 25 Hz, to provide a flicker-free representation.

The liquid crystal indicators are of a growing importance. Liquid crystals are mainly organic compounds which in liquid crystal condition, depending on the surrounding temperature, assume an anisotropic or isotropic phase. In the anisotropic or also meso phase the liquid crystal displays certain crystalline properties, such as for example, the double refraction which can be used for the indicating purpose. In liquid crystals one distinguishes nematic, cholesteric and smectic liquid crystals, depending on the type of the principle of the effective order., For conventional liquid crystal indicators, nematic liquid crystals are utilized. The liquid crystal indicators are composed of one or several cells, each including two glass plates arranged parallel to one another at a distance of approximately 10 $\mu$m. Their inner surfaces are coated with transparent electrode layers which are etched in correspondence with the desired indicator configuration. A nematic liquid crystal is located between the glass plates. The cell is hermetically closed from outside.

Liquid crystal indicators are characterized especially by the low power consumption. Because of their low voltage consumption they can be operated with integrated switching circuits. In the simplest type of control for liquid crystal indicators, all elements or segments of the indicator are controlled in parallel operation. It is, however, possible to connect the same segments of different elements with a control conduit and thereby to reduce the number of the connecting conduits. This type of control is identified as multiplex operation. However, the produced contrast, the angular dependency of the contrast and the angular region are strongly dependent on the multiplex rate of the indicator. The lower is the multiplex ratio, the better is the whole contrast, the lower is the angular dependency and the lower is the angular region of the contrast. Thereby generally the multiplex ratio must be selected as low as possible.

A problem, with the multiplex operation of opto-electronic indicating matrices is the guidance of the conductor connectors. It has been proposed to control the matrix cells lying inside the indicating region by means of the through-contacting points from the rear side of the display, which however is technologically very expensive. Further, it has been proposed to perform the control through thin ducts between the matrix points. In this solution, however, each segment of one cell must be laterally offset relative to the segment of a neighboring cell, so as to produce nonrectilinear columns. As a result, the appearance of the matrix display produces an inhomogeneous impression with zigzag-shaped or inclined symbols.

SUMMARY OF THE INVENTION

Accordingly, it is an object of the present invention to provide an opto-electronic indicating matrix which avoids the disadvantages of the prior art.

More particularly, it is an object of the present invention to provide an opto-electronic indicating matrix which possesses the advantage that the conductor paths or conductors are guided so that respective neighboring segments of different rows can be arranged one above the other and a rectilinear column arrangement can be formed.

In keeping with these objects and with others which will become apparent hereinafter, one feature of the present invention resides, briefly stated, in an opto-electronic indicating matrix with row and column segments controlled in a multiplex operation, wherein the conductors which connect the row and column segments electrically are inclined in the region between the rows toward a longitudinal axis of the rows and extend parallel to one another in one plane.

When the opto-electronic indicating matrix is designed in accordance with the present invention it achieves the above specified objects and eliminates the disadvantages of the prior art.

In accordance with an advantageous embodiment of the present invention, the angle of the conductors to the longitudinal axis of the rows is between 20° and 60° on one side and between 120° and 150° on the other side, preferably 45° or 135°, in a sequence alternating from one row pair to another.

In accordance with a preferred embodiment of the invention, the row and/or column segments are inclined at their corners, and the inclination of the corners extends so that it is parallel to the column conductors which are guided along them. This embodiment has the advantage that the thin conductors can pass to the inwardly located column segments through the intermediate spaces between the segment rows with no problem whatsoever. Advantageously, the respective row and column conductors alternate between the rows. Preferably the respective matrix segment edges can be in alignment with the edges of neighboring matrix segments.

For satisfying the requirement of the minimal multiplex rate in the matrix layout which is provided by half of the lines to be represented, by "folding" a matrix with n rows and m columns, a new matrix with n/2 2m columns is formed. Thereby the driver consumption increases from n+m drivers to n/2+2m, however the contrast of the indicator is considerably increased. In accordance with an especially advantageous embodiment of the invention this is achieved in that the respective rows are electrically connected with one another by conductors in pairs. Moreover, the column segments of the neighboring columns are connected with one another so that the column segments which lie in one row with the segments of neighboring rows are connected with the row segments of the next but one row. Therefore, per one row, two groups of segments which are connected with one another and controlled in parallel are produced.

In accordance with a further embodiment of the invention, the indicating segments are formed as liquid crystal cells or LCD cells.

Opto-electronic indicators can be used in many cases, for example in wrist watches, table clocks, pocket calculators, coding devices, measuring devices, nightguard shields, weights, tank columns, cash registers, etc. However, the inventive liquid crystal cells in a matrix form can be used especially as indicating devices for traveling guidance information in vehicles. For example, for better orientation of a vehicle driver, optical signals, especially digital data such as distance readings can be indicated on a matrix display in accordance with the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
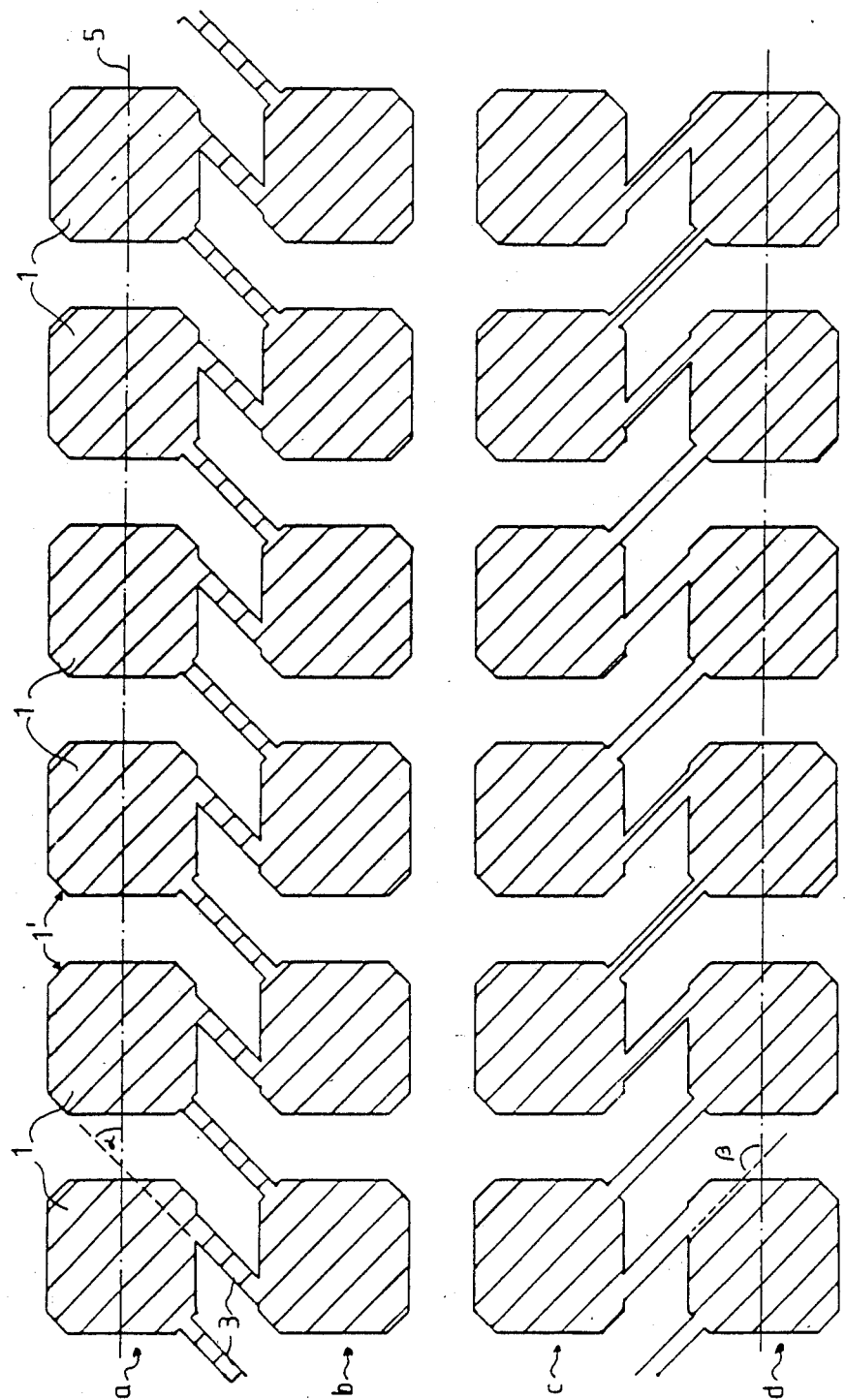
FIG. 1 is a view showing a row connection of several matrix segments.

FIG. 1 shows an arrangement of a matrix with four rows a through d composed of two row pairs a, b and c, d. A segment 1 of one row is connected with a neighboring segment of the next row by a conductor 3. Thus the first segment of the row a is connected by the conductor 3 with the segment of the row b which is located underneath the first mentioned segment. The conductor 3 is inclined toward a longitudinal axis 5 of the row under an angle $\alpha$ of 45°. The first segment of the row b is connected by a further conductor which extends from its upper right corner, to a second segment of the row a located near the first segment of this row. The second segment of the row a is connected through a further conductor with the second segment of the row b. This connection proceeds up to the sixth segment of both rows a and b.

The same is true for the segment rows c and d which also form a pair. The conductors between the segments of the rows c and d form an angle $\beta$ of 135° relative to the longitudinal axis 5 of the row.

Figure 2:
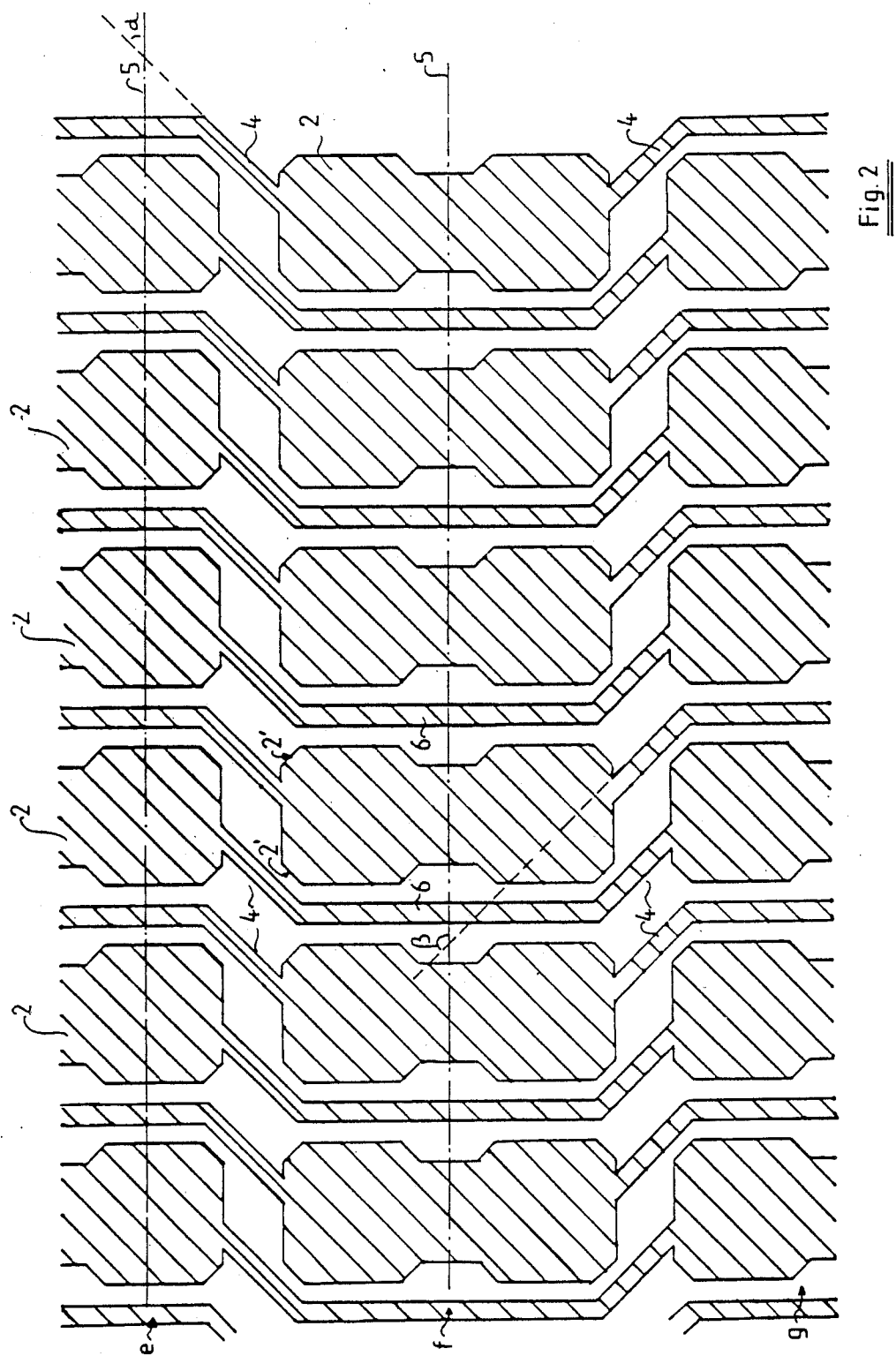
FIG. 2 is a view showing a column connection of several matrix segments.

FIG. 2 shows several columns composed of column segments arranged one under the other and connected with one another. The segments are arranged in rows e, f, and g. The column segments of the row e are connected by conductors 4,6,4 respectively with the segments 2 of the next but one row g. The conductors 4 of the first segment row e form an angle $\alpha$ of 45° with the longitudinal axis 5 of the row and are guided so that they merge in a conductor portion 6 which extends perpendicular to the longitudinal axis 5 of the rows and parallel to the column direction. The conductor portion 6 passes near a segment 2 of the neighboring row f. The conductor portion 6 merges into a conduit 4 which forms an angle $\beta$ 135° with the longitudinal axis 5 of the row and provides the connection to the respective segment of the column g. Thereby in each column respectively one column segment, here segment 2 of the column f, is bridged by the conductors 4,6,4, so that as a whole 2m drivers are required which is a double of the number of columns.

When now the FIGS. 1 and 2 are superimposed over one another, the whole diagram of display in the indicating matrix will be obtained. As shown in FIGS. 1 and 2, corners of each segment 1, 2 are inclined, so that respectively an 8-corner segment is produced. The inclinations are mirror-symmetrical and they enclose with the axis 5 of the rows an angle $\alpha$ or $\beta$ of 45° or 165°. Thereby the indicating surfaces of the segments 1 and 2 are reduced, but simultaneously the place for the conductors 4 and 6 is provided. The conductors are therefore arranged along the respectively released surfaces between the segments. The segments can be arranged thereby close to one another and provide in the whole matrix composed of n rows and m columns a contrast-efficient image without high technical expenses. In particular the individual segments of the rows a through d or e through g can be arranged not only parallel to one another, but also in columns to form respectively a straight final line.

All segments form image points of a liquid crystal display which with low voltage level is characterized by CMOS, MOS and TTL compatibility.

In liquid crystal display, electro-optical effects are used which are performed in the layer of approximately 5 to 30 $\mu$m, mainly 10 $\mu$m, between both glass plates coated with an electrode layer. At least one of the electrode layers must be transparent, for example a layer composed of doped zinc oxide. The uniform orientation of the liquid crystal layers through the limiting surfaces of the display cell is very important. The liquid crystal molecules are either uniformly parallel (homogeneous), perpendicular (homotropic) or inclined to the surface in their orientation. Under the action of the electric field on the liquid crystal molecules clamped between the limiting surfaces, elasto-electric deformations of liquid crystal structures occur. Therefore a distinction is made between the so-called field effect technique and the technique of the dynamic dispersion. With the use of the field effect technique in accordance with the type of the twisted nematic cell (TN cell), the LCD display between cross polarizers in currentless condition is light permeable. After application of a predetermined voltage, the molecule axes are oriented in a field direction so that the turning is removed and the display becomes light-impermeable. The utilization of crossed polarization filters makes possible the production of transmissive indicators with dark symbols on bright surrounding fields, and with the use of parallel polarization filters the production of the transmissive indicators with bright images on dark surrounding field. The reflecting indicators can be produced by attaching an additional reflector foil or by the use of polarization foil with integrated reflector.

Above a predetermined threshold voltage which is applied to a dynamic dispersing cell or on a segment itself, electro-hydrodynamic phenomenon occurs in the liquid crystal layer because of the electrical conductivity of the liquid crystals. Thereby this leads to turbulent currents. The nematic arrangement remains obtained only in partial regions of the liquid crystal layer. These regions are double-refractive. Because of the different orientation in these regions, changes of the refraction index on the borders of neighboring regions occur. They act on the light as dispersion centers. The turbulent regions are recognized in throughgoing light as milk-white. This effect is used for indication purposes, and by respective illumination of the transmissive indicator can be increased before a dark background. Upon switching-off of the voltage the molecules of the liquid crystal again resume their nematic arrangement and the dispersion centers disappear.

Due to the small mounting depth, high contrast properties, great reading angle and small paralux in LCD indicators, a preferable application of the same is the indicators for travel guiding information in electronic guiding and orienting devices of a vehicle. In this situation the predetermined introduced data and the measuring values produced by an electronic compass and a path pulse generator of the vehicle are calculated in a computer or microprocessor to continuously determine for example, distances and angular values to a point of destination and to indicate them on a display. From the above mentioned digital values, also analog process with liquid crystal indicators can be displayed. For this purpose the different sensing points of the individual liquid crystal segments are used, and a grate-like total image is produced on the opto-electronic indicating matrix. When one utilizes liquid crystal indicators which operate as electrically controlled color filters, the indicating image can be represented in color.

It will be understood that each of the elements described above, or two or more together, may also find a useful application in other types of constructions differing from the types described above.

While the invention has been illustrated and described as embodied in an opto-electronic indicating matrix, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An opto-electronic indicating matrix comprising a plurality of display segments arranged in a plurality of rows and a plurality of columns, each of said plurality of display segments being spaced from an adjacent display segment in a respective row and a respective column by a same distance; and a plurality of conductors located in regions between pairs of rows of said display segments for connecting display segments in different rows, each of said conductors being arranged at an angle to a longitudinal axis of said rows.

2. An opto electronic indicating matrix as defined in claim 1, wherein said plurality of rows of said display segments comprises a plurality of pairs of rows of said display segments, said plurality of conductors including first conductors being arranged parallel to each other, and second conductors being arranged parallel to each other, said first and second conductors connecting said display segments of adjacent pairs of rows of said plurality of pairs of rows, respectively, and being arranged at an angle of between 30° and 60° and 150° and 120°, respectively, to the longitudinal axis of said rows.

3. An opto electronic indicating matrix as defined in claim 2, wherein said first and second conductors are arranged to the longitudinal axis of said rows at an angle of 45° and 135°, respectively.

4. An opto electronic indicating matrix as defined in claim 2, wherein each of the display segments of each of said plurality of rows has at edges thereof inclined surfaces that lie substantially parallel to at least one of said first and second conductors.

5. An opto electronic indicating matrix as defined in claim 2, wherein each of the display segments of each of said plurality of columns has at edges thereof inclined surfaces that lie substantially parallel to at least one of said first and second conductors.

6. An opto electronic indicating matrix as defined in claim 2, wherein each of the display segments of each of said plurality of rows has at edges thereof first inclined surfaces that lie substantially parallel to at least one of said first and second conductors, and each display segment of each of said plurality of columns has at edges thereof second inclined surfaces that lie substantially parallel to another of said first and second conductors.

7. An opto electronic indicating matrix as defined in claim 1, wherein said display segments are liquid crystal cells.

8. An opto electronic indicating matrix as defined in claim 1, wherein each of said conductors comprises a first portion extending to a longitudinal axis of said rows at a first angle, a second portion spaced from said first portion and extending to the longitudinal axis of said rows at a second angle complementary to said first angle, and an intermediate portion extending transverse to the longitudinal axis of said rows and connecting said first and second spaced portions.

9. An opto electronic indicating matrix as defined in claim 1 wherein each of said plurality of display segments is formed as a column display segment, and said plurality of conductors includes conductors that connect two column display segments of a same column of display segments and which two column segments are separated by an intermediate display segment of the same column of display segments.

* * * * *